US012801863B2

(12) United States Patent
Sassak, Jr. et al.

(10) Patent No.: US 12,801,863 B2
(45) Date of Patent: Nov. 17, 2026

(54) METHODS AND SYSTEMS FOR RETRIEVAL-AUGMENTED GENERATION USING SYNTHETIC QUESTION EMBEDDINGS

(71) Applicant: SHOPIFY INC., Ottawa (CA)

(72) Inventors: Christopher Michael Sassak, Jr., Austin, TX (US); Justin Paul Belzile, Vancouver (CA); Stephen Prater, Portland, OR (US); Mohammad Maysami, Boston, MA (US); Matthew Ratzloff, Portland, OR (US)

(73) Assignee: SHOPIFY INC., Ottawa (CA)

( * ) Notice: Subject to any disclaimer, the term of this patent is extended or adjusted under 35 U.S.C. 154(b) by 191 days.

(21) Appl. No.: 18/588,583

(22) Filed: Feb. 27, 2024

(65) Prior Publication Data

US 2025/0272506 A1 Aug. 28, 2025

(51) Int. Cl.
*G06F 40/40* (2020.01)
*G06F 40/35* (2020.01)

(52) U.S. Cl.
CPC .............. *G06F 40/40* (2020.01); *G06F 40/35* (2020.01)

(58) Field of Classification Search
CPC ................................. G06F 40/40; G06F 40/35
USPC .............................................................. 704/9
See application file for complete search history.

(56) References Cited

U.S. PATENT DOCUMENTS 11,210,286 B2 * 12/2021 Yazdani ................ G06F 16/243
11,481,387 B2 * 10/2022 Yazdani ................ G06F 16/951
2019/0205444 A1 * 7/2019 Yazdani ................ G06F 16/243
2019/0205445 A1 * 7/2019 Yazdani ................ G06F 16/951
2024/0242154 A1 * 7/2024 Jindal ................ G06Q 10/0637
2025/0005293 A1 * 1/2025 Nguyen .................. G06F 40/30
2025/0077940 A1 * 3/2025 Cui ........................ G06N 20/00
(Continued)

FOREIGN PATENT DOCUMENTS

CN 116932708 A * 10/2023 ......... G06F 16/3329
KR 20230151863 A * 11/2023 ............. G06N 3/094
WO WO-2025179374 A1 * 9/2025 ............. G06F 40/30

OTHER PUBLICATIONS

Lewis, P., et al. Retrieval-Augmented Generation for Knowledge-Intensive NLP Tasks. In: arXiv.org: 2005.11401, Apr. 12, 2021.*
(Continued)

*Primary Examiner* — Edwin S Leland, III
(74) *Attorney, Agent, or Firm* — Smart & Biggar LP

(57) ABSTRACT

Methods and systems for retrieval-augmented generation are described. Responsive to a user input, an input embedding associated with the user input is obtained. A synthetic question embedding is retrieved from an embeddings database, based on a similarity to the input embedding. The synthetic question embedding is used to obtain a relevant source text based on a stored mapping between the synthetic question embedding and the source text. A prompt is provided to a large language model (LLM) to generate and display a textual response to the user input, based on the user input and the source text. The disclosed methods and systems effectively narrow the pool of source documents based on similarity measures between the user input embedding and the synthetic question embedding, to enable the retrieval of more relevant sources for use in response generation.

20 Claims, 8 Drawing Sheets

(56) References Cited

U.S. PATENT DOCUMENTS

| | | | | |
|---|---|---|---|---|
| 2025/0156644 | A1* | 5/2025 | Neerukonda | G06N 3/0455 |
| 2025/0191237 | A1* | 6/2025 | Marri | G06T 11/00 |
| 2025/0245248 | A1* | 7/2025 | Brenner | G06F 16/3329 |
| 2025/0265285 | A1* | 8/2025 | Yoon | G06F 16/2438 |
| 2025/0272506 | A1* | 8/2025 | Sassak, Jr. | G06F 40/40 |

OTHER PUBLICATIONS

Zhang, Y., et al. Langchain-Chatchat README_en.md. In: githib LangChain-Chatchat project, Feb. 6, 2024.*

Muludi, Kurnia, et al., "Retrieval-Augmented Generation Approach: Document Question Answering Using Large Language Model", International Journal of Advanced Computer Science and Applications, vol. 15, No. 3, 2024, pp. 776-785, www.ijacsa.thesai.org.

Canadian Intellectual Property Office, "International Search Report and Written Opinion" for corresponding PCT application No. PCT/CA2025/050229 dated Jun. 17, 2025.

Lewis, P., et al. Retrieval-Augmented Generation for Knowledge-Intensive NLP Tasks. In: arXiv.org: 2005.11401, Apr. 12, 2021 (Apr. 12, 2021), [online] [retrieved on May 28, 2025 (May 28, 2025)]. Retrieved from the internet: https://arXiv.org/abs/2005.11401.

Zhang, Y., et al. Langchain-Chatchat README_en.md. In: githib LangChain-Chatchat project, Feb. 6, 2024 (Feb. 6, 2024), [online] [retrieved on May 28, 2025 (228-05-2025), Retrieved from the internet: https://github.com/chatchat-space/Langchain-Chatchat/blob/c4906923a181aafbace2d33b8022f046b7fec408/README_en .md.

* cited by examiner

METHODS AND SYSTEMS FOR RETRIEVAL-AUGMENTED GENERATION USING SYNTHETIC QUESTION EMBEDDINGS

FIELD

The present disclosure relates to machine learning and large language models (LLMs), and, more particularly, to retrieval-augmented generation (RAG), and, yet more particularly, to the use of synthetic question embeddings for source retrieval.

BACKGROUND

A large language model (LLM) is a type of machine learning (ML) model that can process natural language to summarize, translate, predict and generate text and other content. A LLM may be trained to learn billions of parameters in order to model how words relate to each other in a textual sequence. Inputs to a LLM may be referred to as prompts. A prompt is a natural language input that includes instructions to cause the LLM to generate a desired output, including natural language text or other generative output in various desired formats.

Retrieval Augmented Generation (RAG) is a process for optimizing the output of an LLM, by referencing a knowledge base (i.e., a database of documents that contain useful information) or other external sources that are outside the LLM training data sources, prior to generating a response.

A chatbot is a type of artificial intelligence that typically provides assistance to a user via a conversational interaction. Some chatbots make use of LLMs to carry out user interactions. Chatbots may also be referred to as virtual assistants, conversational agents, or smart assistants.

SUMMARY

Retrieval-augmented generation (RAG) is an AI framework used by search engines or LLM-based chatbots to improve the quality of generated responses. Rather than relying on the knowledge inherent to the LLM at the time it was trained (e.g., the knowledge contained in the dataset on which the LLM was trained), a RAG-based engine retrieves data from internal sources (e.g., a knowledge base) and/or external sources (e.g., public data accessible via the internet) to improve the quality of response generation, for example, to help ensure that the LLM is drawing from accurate and up-to-date information and enabling the LLM to include a source for the information provided in the generated output. Conventionally, virtual assistants (also referred to as chatbots) or existing search methods employing the RAG framework often have access to a database of stored documents and corresponding document embeddings (e.g., embeddings in a corpus embedding space), to assist in generating responses. In response to a user input (e.g., a query or a search request), the chatbot or search engine may encode the user input into an input embedding and perform a vector similarity search to identify, based on similarity of the corresponding embeddings, documents that are deemed relevant to the user input. Identified document(s) are then retrieved from the database and used as additional input to the LLM to generate a response to the user input.

A limitation of this conventional RAG approach is that the documents in the database are typically embedded based on textual content, causing documents with similar words to be positioned close together within the embedding space. This proximity may cause the chatbot or search engine to retrieve documents with words, phrases, and topics having semantic similarity to the words and phrases in the user input, but of incorrect scope for the given user input, causing the LLM to generate a poor-quality response. Furthermore, this approach can be too sensitive to the phrasing of the user input, meaning that non-experts with a limited grasp of technical concepts or those unfamiliar with the specific terminology of the knowledge base may struggle to effectively phrase a query in a way that returns relevant results. For example, a user input such as "how do I change the website name for my store?" may result in retrieval of an irrelevant document about adjusting a title block or headings on a webpage, rather than a relevant document about how to change to a custom domain name. When the irrelevant document is provided to the LLM to generate a response, the generated response is often of poor quality or insufficient to address the user's issue. This means that the overall performance of the LLM (e.g., ability to generate relevant and accurate output) can be negatively impacted by the conventional RAG framework. Additionally, because the initial output from the LLM may be irrelevant or insufficient to address the user's issue, the user may need to provide multiple inputs (e.g., trying to phrase a query in different ways) to the LLM before obtaining a relevant and useful output from the LLM, or the LLM may rely on a Chain-of-Thought prompting approach to iteratively generate a response, for example, where the generation process is broken into multiple steps (e.g., using a sequence of follow-up questions to a user) to improve reasoning. Either of these scenarios can cause a significant increase in consumption of computing resources (e.g., significant use of processor power, memory resources, bandwidth, etc.) for example due to additional communications with the LLM requiring additional prompting of the LLM and additional executions of the LLM. In at least some contexts, these techniques requiring multiple executions of the LLM may generate poorer quality results than the novel technique described herein.

One approach that aims to address the problem of document mismatch is Hypothetical Document Embeddings (HyDE). In response to a user input providing a query, the HyDE approach instructs an LLM to generate a hypothetical response that aims to provide an answer to the query but that may include hallucinations and incorrect information. Using this hypothetical response, a document intended to be relevant to the query is identified in a corpus, based on vector similarity of corresponding embeddings. However, as the hypothetical response may include hallucinations and other incorrect information, any documents retrieved based on a similarity to the hypothetical response may also contain incorrect or erroneous information, causing the LLM to produce irrelevant or insufficient responses. Again, the result is poor LLM performance and increased consumption of computing resources. Furthermore, in at least some contexts the relevance of the identified document is poor or questionable.

In various examples, the present disclosure provides a technical solution for implementing a RAG-based framework that addresses at least some of the above drawbacks. Examples of the disclosed RAG-based engine enable more accurate identification of relevant sources for use in response generation by an LLM. The disclosed RAG-based engine more effectively narrows the pool of potential source documents based on a similarity of a user input embedding (i.e., an embedding encoded based on a user input for example, an embedding encoded from an updated user input that has been automatically rephrased in the form of a question) to a synthetic question embedding, enabling the retrieval of more relevant source documents to be used by the LLM to generate an output in response to the user input. This provides a technical advantage in that the LLM is provided with more relevant information to enable the LLM to generate appropriate output in fewer iterations (e.g., providing a relevant output the first time a user inputs a query, rather than requiring the user to try different phrasing of a query), thereby reducing the unnecessary consumption of computing resources (e.g., processing power, memory, computing time, etc.) associated with performing multiple iterations of prompting to achieve a desired result from the LLM.

Examples of the disclosed RAG-based engine may improve the performance of e-commerce platforms or merchant websites by presenting an improved help center or knowledge base experience to users. Examples of the disclosed technical solution leverage the semantic understanding capabilities of an LLM to formulate more accurate and relevant synthetic questions, thereby improving the accuracy and efficiency of document retrieval and response generation.

In some examples, the present disclosure describes a computer-implemented method. The method includes a number of steps, including: responsive to a user input, obtaining an input embedding associated with the user input; retrieving a synthetic question embedding from an embeddings database, based on a similarity to the input embedding; obtaining a source text based on a stored mapping between the synthetic question embedding and the source text; using a large language model (LLM), generating a textual response to the user input, based on the user input and the source text; and providing the generated textual response for display via a user device.

In an example of the preceding example aspect of the method, wherein the embeddings database stores a plurality of synthetic question embeddings associating the plurality of synthetic question embeddings to corresponding source texts.

In an example of the preceding example aspect of the method, the method further comprising: prior to receiving the user input: using the LLM, generating a set of synthetic questions based on the source text; applying an embedding transformation to generate a set of synthetic question embeddings; and storing the set of synthetic question embeddings in the embeddings database.

In an example of a preceding example aspect of the method, wherein the embeddings database stores a plurality of embeddings defining an embedding space and wherein retrieving the synthetic question embedding from the embeddings database comprises: performing a vector similarity search operation within the embedding space to identify the synthetic question embedding, based on similarity measures between embeddings of the plurality of synthetic question embeddings and the input embedding.

In an example of the preceding example aspect of the method, wherein the similarity measure is a distance measure.

In an example of a preceding example aspect of the method, wherein the similarity measure is a cosine similarity.

In an example of a preceding example aspect of the method, wherein obtaining an input embedding associated with the user input comprises: applying an embedding transformation to generate the input embedding.

In an example of the preceding example aspect of the method, wherein the method further comprises: prior to applying the embedding transformation to generate the input embedding: determining whether the user input is phrased in a question format; generating, based on the determining, a prompt to the LLM including the user input, the prompt for instructing the LLM to generate an updated user input that is phrased in a question format; and providing the prompt to the LLM to generate the updated user input.

In an example of a preceding example aspect of the method, wherein generating the textual response to the user input comprises: generating a prompt to the LLM, the prompt including the user input and the source text; and providing the prompt to the LLM to generate the textual response.

In an example of the preceding example aspect of the method, wherein the prompt includes information about the user's recent viewing or search history.

In some examples, the present disclosure describes a computer system including: a processing unit configured to execute computer-readable instructions to cause the system to: responsive to a user input, obtain an input embedding associated with the user input; retrieve a synthetic question embedding from an embeddings database, based on a similarity to the input embedding; obtain a source text based on a stored mapping between the synthetic question embedding and the source text; using a large language model (LLM), generate a textual response to the user input, based on the user input and the source text; and provide the generated textual response for display via a user device.

In an example of the preceding example aspect of the system, wherein the embeddings database stores a plurality of synthetic question embeddings associating the plurality of synthetic question embeddings to corresponding source texts.

In an example of the preceding example aspect of the system, wherein the processing unit is further configured to execute computer-readable instructions to cause the computer system to, prior to receiving the user input: use the LLM, generating a set of synthetic questions based on the source text; apply an embedding transformation to generate a set of synthetic question embeddings; and store the set of synthetic question embeddings in the embeddings database.

In an example of a preceding example aspect of the system, wherein the embeddings database stores a plurality of embeddings defining an embedding space and wherein in retrieving the synthetic question embedding from the embeddings database, the processing unit is further configured to execute computer-readable instructions to cause the computer system to: perform a vector similarity search operation within the embedding space to identify the synthetic question embedding, based on similarity measures between embeddings of the plurality of synthetic question embeddings and the input embedding.

In an example of the preceding example aspect of the system, wherein the similarity measure is a distance measure.

In an example of a preceding example aspect of the system, wherein the similarity measure is a cosine similarity.

In an example of a preceding example aspect of the system, wherein in obtaining an input embedding associated with the user input, the processing unit is further configured to execute computer-readable instructions to cause the computer system to: apply an embedding transformation to generate the input embedding.

In an example of the preceding example aspect of the system, wherein the processing unit is further configured to execute computer-readable instructions to cause the computer system to, prior to applying the embedding transformation to generate the input embedding: determine whether the user input is phrased in a question format; generate, based on the determining, a prompt to the LLM including the user input, the prompt for instructing the LLM to generate an updated user input that is phrased in a question format; and provide the prompt to the LLM to generate the updated user input.

In an example of a preceding example aspect of the system, wherein in generating the textual response to the user input, the processing unit is further configured to execute computer-readable instructions to cause the computer system to: generate a prompt to the LLM, the prompt including the user input and the source text; and provide the prompt to the LLM to generate the textual response.

In an example of the preceding example aspect of the system, wherein the prompt includes information about the user's recent viewing or search history.

In some examples, the present disclosure describes a non-transitory computer-readable medium storing instructions that, when executed by a processing unit of a computing system, cause the computing system to: responsive to a user input, obtain an input embedding associated with the user input; retrieve a synthetic question embedding from an embeddings database, based on a similarity to the input embedding; obtain a source text based on a stored mapping between the synthetic question embedding and the source text; using a large language model (LLM), generate a textual response to the user input, based on the user input and the source text; and provide the generated textual response for display via a user device.

In some examples, the computer-readable medium may store instructions that, when executed by the processor of the computing system, cause the computing system to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1A:
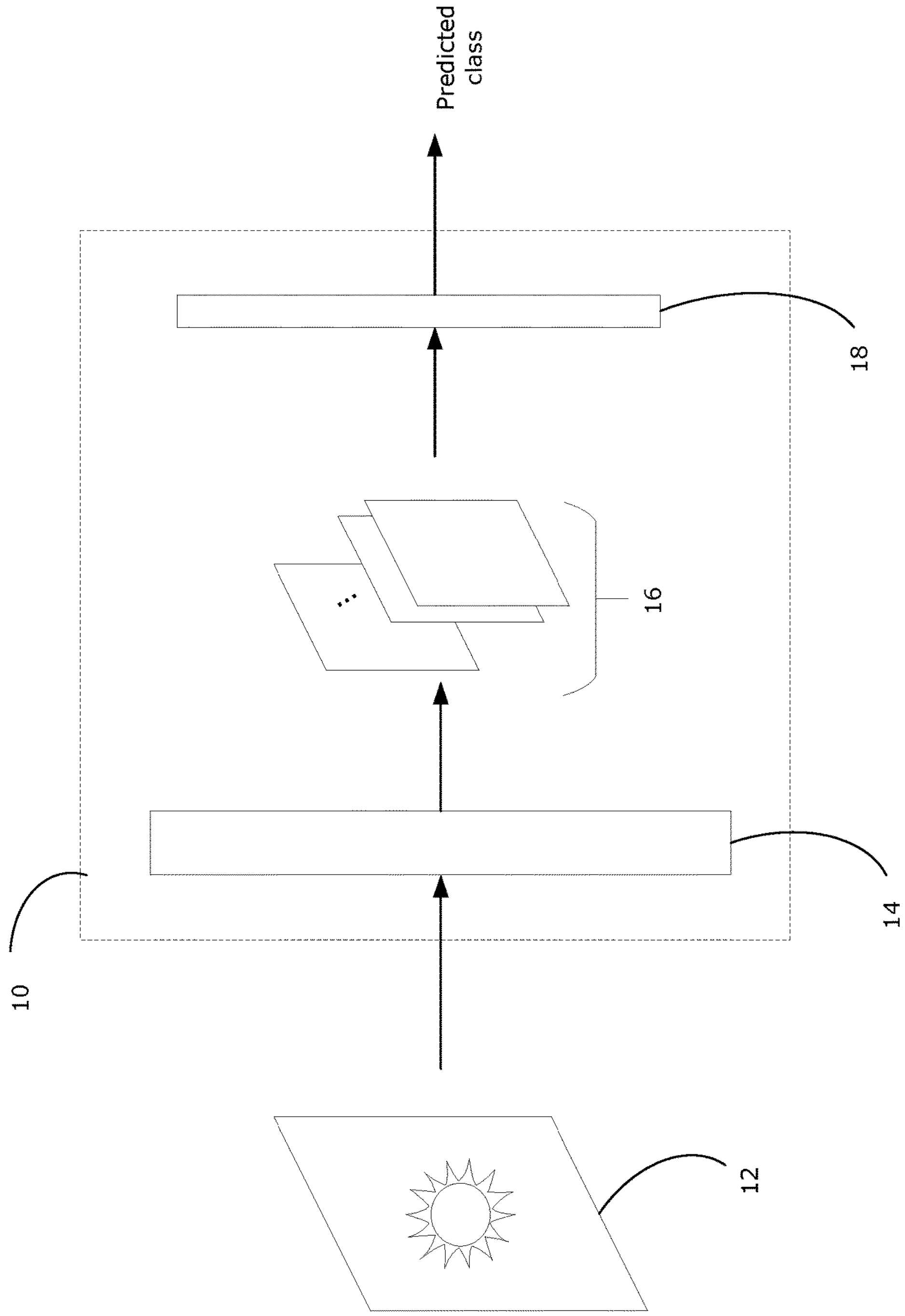
FIG. 1A is a block diagram of a simplified convolutional neural network, which may be used in examples of the present disclosure.

In various examples, the present disclosure describes methods and systems for implementing a retrieval augmented generation (RAG)-based engine, including a retrieval module, for automatically narrowing the pool of potential source documents based on a similarity between an embedding corresponding to a user input and embeddings corresponding to a set of synthetic questions, and enabling the retrieval of more relevant source documents. The RAG-based engine generates prompts to a large language model (LLM), including the user input and an identified relevant source text, and receives output from the LLM to more efficiently generate output that may assist a user in solving a problem or answering a question.

Examples of the disclosed RAG-based engine enable more accurate identification of relevant sources for use in response generation by an LLM. The disclosed RAG-based engine more effectively narrows the pool of potential source documents based on a similarity of a user input embedding (i.e., an embedding encoded from a user input, such as a query) to a synthetic question embedding, enabling the retrieval of more relevant source documents to be used by the LLM to generate an output in response to the user input. This provides a technical advantage in that the LLM is provided with more relevant information to enable the LLM to generate appropriate output in fewer iterations (e.g., providing a relevant output the first time a user inputs a query, rather than requiring the user to try different phrasing of a query), thereby reducing the unnecessary consumption of computing resources (e.g., processing power, memory, computing time, etc.) associated with performing multiple iterations of prompting to achieve a desired result from the LLM.

Examples of the disclosed RAG-based engine may improve the performance of e-commerce platforms or merchant websites by presenting an improved help center or knowledge base experience to users. Examples of the disclosed technical solution leverage the semantic understanding capabilities of an LLM to formulate more accurate and relevant synthetic questions, thereby improving the accuracy and efficiency of document retrieval and response generation.

As will be discussed further below, examples of the disclosed RAG-based engine may send prompts to and receive output from an LLM, which is a type of deep neural network.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. An input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 1B:
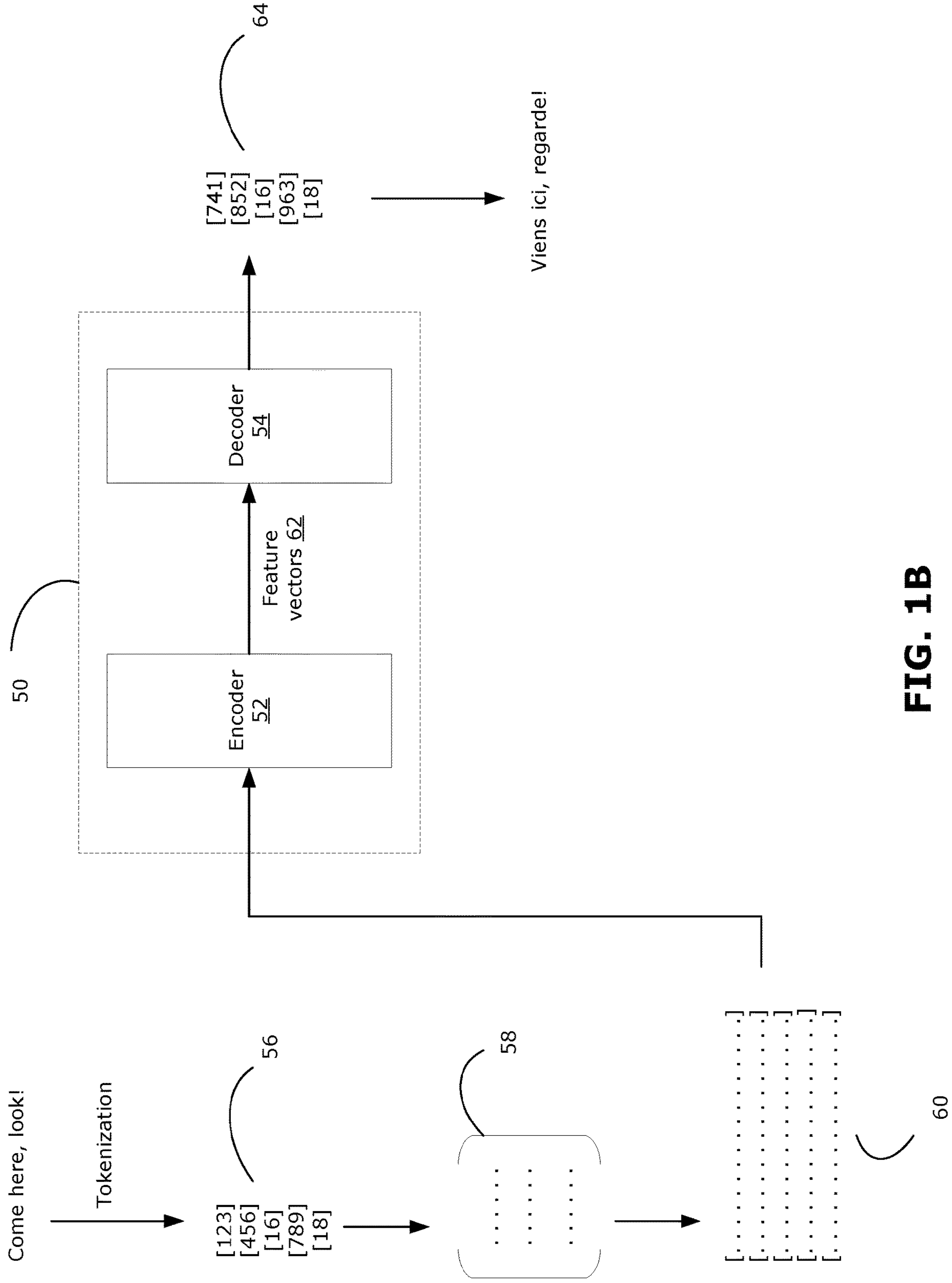
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labeled (e.g., annotated to indicate verbs, nouns, etc.) or unlabeled. LLMs may be trained on a large unlabeled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" is illustrated as input to the transformer 50. Tokenization of the text sequence into the tokens 56 may be performed by some preprocessing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space (or embedding space) may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Although described above in the context of language tokens, embeddings and feature vectors are also commonly used to encode information about objects and their relationships with each other. For example, embeddings and feature vectors are frequently used in computer vision applications for object detection and semantic understanding. Embeddings that represent objects may be found in an embedding space, where the similarity and relationship of two objects (e.g., similarity between a cat and a lion) may be represented by the distance between the two corresponding embeddings in the embedding space.

Figure 2:
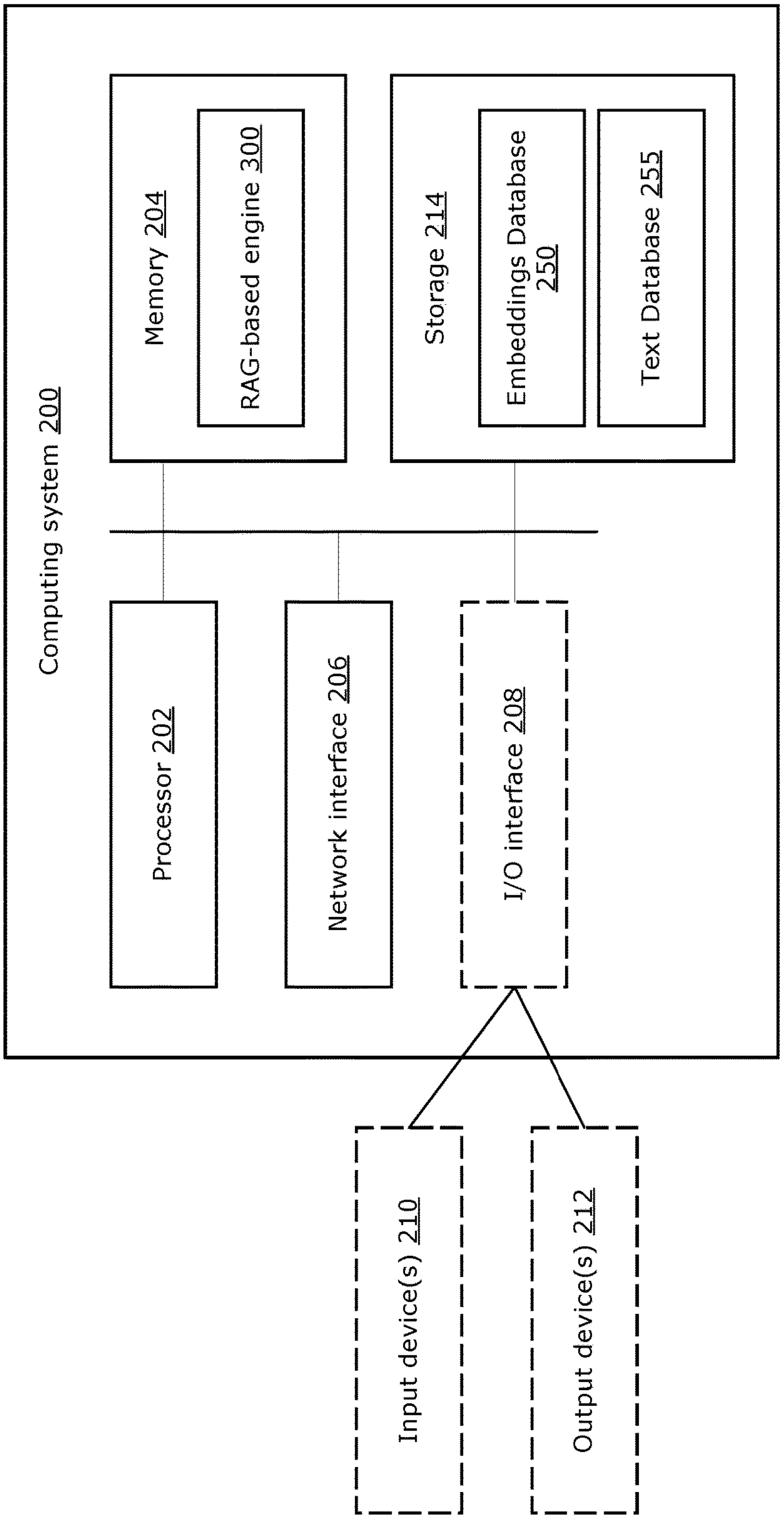
FIG. 2 is a block diagram of an example computing system, which may be used to implement examples of the present disclosure.

FIG. 2 illustrates an example computing system 200, which may be used to implement examples of the present disclosure. For example, the computing system 200 may be used to generate a prompt to an LLM to cause the LLM to generate output that includes text in a token-efficient language as disclosed herein. Additionally or alternatively, one or more instances of the example computing system 200 may be employed to execute the LLM. For example, a plurality of instances of the example computing system 200 may cooperate to provide output using an LLM in manners as discussed above.

The example computing system 200 includes at least one processing unit and at least one physical memory 204. The processing unit may be a hardware processor 202 (simply referred to as processor 202). The processor 202 may be, for example, a central processing unit (CPU), a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 204 may include a volatile or non-volatile memory (e.g., a flash memory, a random access memory (RAM), and/or a read-only memory (ROM)). The memory 204 may store instructions for execution by the processor 202, to the computing system 200 to carry out examples of the methods, functionalities, systems and modules disclosed herein.

The computing system 200 may also include at least one network interface 206 for wired and/or wireless communications with an external system and/or network (e.g., an intranet, the Internet, a P2P network, a WAN and/or a LAN). A network interface may enable the computing system 200 to carry out communications (e.g., wireless communications) with systems external to the computing system 200, such as a LLM residing on a remote system.

The computing system 200 may optionally include at least one input/output (I/O) interface 208, which may interface with optional input device(s) 210 and/or optional output device(s) 212. Input device(s) 210 may include, for example, buttons, a microphone, a touchscreen, a keyboard, etc. Output device(s) 212 may include, for example, a display, a speaker, etc. In this example, optional input device(s) 210 and optional output device(s) 212 are shown external to the computing system 200. In other examples, one or more of the input device(s) 210 and/or output device(s) 212 may be an internal component of the computing system 200.

A computing system, such as the computing system 200 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, in a message (e.g., in a payload of a message).

In the example of FIG. 2, the computing system 200 may store in the memory 204 computer-executable instructions, which may be executed by a processing unit such as the processor 202, to implement one or more embodiments disclosed herein. For example, the memory 204 may store instructions for implementing a RAG-based engine 300, which may include a user interface (UI) 305, a rephrase operator 320, an embedding generator 330, a retrieval module 350 and a prompt generator 370, described with respect to FIG. 3 and FIG. 4 below.

In some examples, the computing system 200 may be a server of an online platform that provides the RAG-based engine 300 as a web-based or cloud-based service that may be accessible by a user device (e.g., via communications over a wireless network). Other such variations may be possible without departing from the subject matter of the present application.

The computing system 200 may also include a storage unit 214, which may include a mass storage unit such as a solid state drive, a hard disk drive, a magnetic disk drive and/or an optical disk drive. The storage unit 214 may store data, for example, an embeddings database 250 and a text database 255, among other data. In some examples, the storage unit 214 may serve as a database accessible by other components of the computing system 200. In some examples, the embeddings database 250 and/or the text database 255 may be external to the computing system 200, for example the computing system 200 may communicate with an external system to access the embeddings database 250 and/or the text database 255.

As will be discussed further below, the present disclosure describes an example RAG-based engine that provides a relevant source text (in particular, source text that has been retrieved based on a similarity of a user input embedding to a synthetic question embedding) to a LLM prior to prompting the LLM to generate output (e.g., an answer to a user query) for assisting a user.

Figure 3:
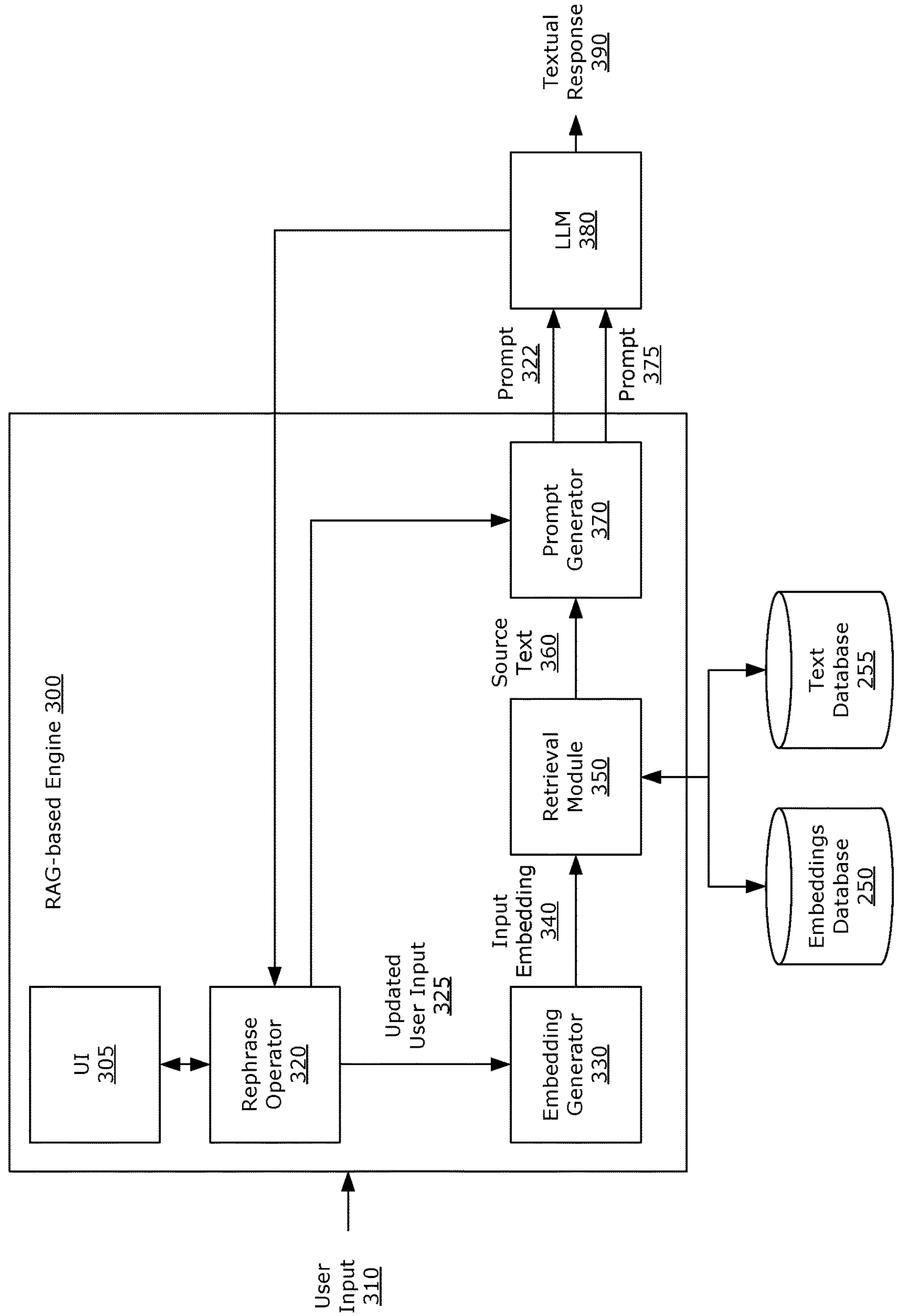
FIG. 3 is a block diagram illustrating an example RAG-based engine, in accordance with example embodiments of the present disclosure.

FIG. 3 shows a block diagram of an example architecture for the RAG-based engine 300, in accordance with examples of the present disclosure. The RAG-based engine 300 may be a software that is implemented in the computing system 200 of FIG. 2, in which the processor 202 is configured to execute instructions of the RAG-based engine 300 stored in the memory 204. The RAG-based engine 300 includes a user interface (UI) 305, a rephrase operator 320, an embedding generator 330, a retrieval module 350, and a prompt generator 370. It should be understood that the modules 305, 320, 330, 350 and 370 are exemplary and not intended to be limiting. For example, the RAG-based engine 300 may include a greater or fewer number of modules than that shown. As well, operations described as being performed by a particular module may be additionally or alternatively performed by another subsystem. For example, operations of the embedding generator 330 may be part of the operations of the retrieval module 350. Similarly, operations of the rephrase operator 320 may be part of the operations of the prompt generator 370. The RAG-based engine 300 may receive a user input 310 and generate a prompt 375 for providing to a LLM 380 for generating a textual response 390 to the user input 310.

In examples, the user input 310 may be received by the RAG-based engine 300, for example, via the UI 305. In examples, the RAG-based engine 300 may be associated with a knowledge base search or a chatbot operation, among other applications. In examples, the user input 310 may be received as a textual input, for example, received via a textbox object in a knowledge base search UI or in a chat window in a chatbot UI, among others. In other examples, the user input 310 may be an audio input, for example, received via a microphone of computing system 200, or the user input 310 may be received in another format, for example, as a touch input, or the user input 310 may be received as a selection of an item (e.g., a topic or category, or another object) on a webpage of an e-commerce platform, among other inputs. In some embodiments, for example, the user input 310 may be phrased as a question (e.g., "how do I add a product to my online store?") or the user input may not be phrased as a question. For example, a user input 310 may be phrased as a statement (e.g., "I'm trying to add a product to my online store"), a topic or category (e.g., "adding products to an online store"), or a keyword (e.g., "products"), or the user input may be phrased as a problem the user is experiencing (e.g., "I'm having trouble adding products to my online store"), among others.

In some examples, the RAG-based engine 300 may request that the user provide clarification on the input, for example, where a user input 310 may be interpreted in more than one way, for example, depending on whether the user is a merchant or whether the user is a customer. For example, a user input 310 of "where is my order button?" when posed by a merchant, may indicate that the merchant is looking for information on fulfilling orders within the administrator console, rather than a customer who may be seeking an order status.

In some embodiments, for example, responsive to the user input 310, the rephrase operator 320 may interface with the prompt generator 370 and the LLM 380 to generate an updated user input 325. In examples, the RAG-based engine 300 may determine whether the user input 310 is phrased in a question format (e.g., the RAG-based engine 300 may perform grammatical parsing of the user input 310 to determine whether the user input 310 is phrased in a question format). In some embodiments, for example, in response to determining that the user input 310 that is not phrased in a question format, the rephrase operator 320 may automatically generate an updated user input 325 that reflects the user input 310 phrased in a question format. In some examples, the rephrase operator 320 may automatically generate an updated user input 325 that rephrases the user input 310 into a format that may enable more effective similarity matching with synthetic question embeddings (as discussed further below), regardless of whether or not the user input 310 is already phrased in a question format. In some embodiments, for example, the updated user input 325 may be generated via a semantic understanding of the user input 310. For example, the rephrase operator 320 may interface with the prompt generator 370 to generate a prompt 322, including the user input 310, to the LLM 380 for instructing the LLM 380 to generate the updated user input 325 that is phrased in a question format. In examples, the prompt generator 370 may provide the prompt 322 to the LLM 380 to generate the updated user input 325. In examples, the rephrase operator 320 may then provide the updated user input 325 to the embedding generator 330. Optionally or alternatively, the rephrase operator 320 may interface with the UI 305 to gather further information to clarify the user's intent, to request that the user rephrase the user input 310 in a question format, or to confirm that the updated user input 325 reflects an accurate rephrasing of the user input 310. For example, the updated user input 325 may be presented to the user (e.g., "you said 'my screen is too bright'. Are you asking 'how to dim my screen'?") via the UI 305. In other examples, this rephrasing of the user input 310 may be hidden from the user. For example, the prompt generator 370 may obtain the user input 310 and insert instructions to the LLM to generate the following example prompt (example 1):

> Please rephrase the following user input as an e-commerce-related question, such as 'How do I sell a domain?', 'How do I fulfil orders?', 'How do I set up discounts?', 'How can I hire an expert?', or 'How do I go about setting up a point of sale?':

<user input>

In examples, the embedding generator 330 may receive the updated user input 325 and may generate an input embedding 340 that is based on the user input 310 (e.g., the input embedding 340 may be generated from the updated user input 325, which is a rephrasing of the user input 310). In some examples, the embedding generator 330 may generate the input embedding 340 from the user input 310 without rephrasing (e.g., if the user input 310 is already in the format of a question). Generating the input embedding 340 from the updated user input 325, rather than directly from the user input 310, may provide advantages in that the updated user input 325 may be rephrased by the rephrase operator 320 into a format that may enable better similarity matching in the embedding space, as discussed further below. However, in some instances rephrasing of the user input 310 into the updated user input 325 may not be necessary. In the present disclosure, "embeddings" can refer to learned representations of discrete variables as vectors of numeric values, where the "dimension" of the embedding corresponds to the length of the vector (i.e., each entry in the embedding is a numeric value in a respective dimension represented by the embedding). In some examples, embeddings may be referred to as embedding vectors. In examples, embeddings may represent a mapping between discrete variables and a vector of continuous numbers that effectively capture meaning and/or relationships in the data. In examples, embeddings may be represented as points in a multidimensional space (which may be referred to as the embedding space), where embeddings exhibiting similarity are clustered closer together. In examples, embeddings may be learned for neural network models.

In examples, the embedding generator 330 may apply an embedding transformation to the user input 310 or the updated user input 325, to generate the input embedding 340. In some embodiments, for example, the embedding generator 330 may be an encoder. In examples, the embedding generator 330 may transform the user input 310 or the updated user input 325 into a respective embedding vector within an embedding space, to generate the input embedding 340. In examples, the embedding generator 330 may apply the transformation using a neural network model.

In examples, the retrieval module 350 may receive the input embedding 340 for obtaining a relevant source text 360 that is associated with the user input 310. In examples, the retrieval module 350 is configured to interface with a database of stored synthetic question embeddings (e.g., the embeddings database 250) and a database of stored source texts or documents (e.g., the text database 255) for retrieving the relevant source text 360. As described in further detail with respect to FIG. 4 below, the retrieval module 350 may first retrieve a synthetic question embedding 354 from the embeddings database 250, based on similarity measures between embeddings of the plurality of synthetic question embeddings stored in the embeddings database 250 and the input embedding 340. In examples, the retrieval module 350 may then obtain the source text 360 from the text database 255, based on a stored mapping between the synthetic question embedding 354 and the source text 360.

In examples, based on the user input 310 and the source text 360, the prompt generator may generate a prompt 375 to the LLM 380 (such as GPT-3, or an aggregation of multiple LLMs or other models), where the prompt 375 instructs the LLM 380 (or multiple LLMs or other models) to generate a textual response 390 to the user input 310 or the updated user input 325. In examples, if the user input 310 included an input phrased in a question format, the prompt 375 may instruct the LLM 380 to generate an answer to the question posed in the user input 310, using the identified source text 360. In examples, the LLM 380 may be prompted to parse the relevant section of the identified source text 360 and to output an answer to the question posed in the user input 310. In other examples, the LLM 380 may be prompted to parse the relevant section of the identified source text 360 and to output an answer to the updated user input 325 (that is phrased in a question format). In this regard, examples of the present disclosure leverage the semantic understanding capabilities of the LLM 380 along with a more relevant source text 360 for augmenting the LLM 380, to enable the LLM 380 to generate more accurate and relevant textual responses to the user input 310.

In some embodiments, for example, the prompt generator 370 may also obtain contextual information, for example information about the user's account profile, account type, demographics, country, language, recent viewing or search history, for example, recent webpages visited, recent documents viewed, previous search queries or previous user inputs 310 etc. For example, the user's recent viewing or search history may be obtained from a browser application (e.g., the UI 305 may be accessed by the user via a browser), or from data stored in a user profile associated with the user, among other possibilities. In other examples, the prompt generator 370 may obtain information about a user's account, for example, a membership or subscription status or a membership-tier, for example, whether the user is a merchant or a customer, among others. In examples, the prompt 375 may also include contextual information about the user's recent viewing or search history, or the user's account and the LLM 380 may be prompted to parse this contextual information along with the source text 360 for generating the textual response 390.

In examples, the generated textual response 390 may be provided for display via a user device. For example, the LLM 380 may be configured to cooperate with the UI 305 for displaying the textual response 390 on a display of a user device (e.g., the textual response 390 from the LLM 380 may be outputted to the RAG-based engine 300, to enable the textual response 390 to be presented via the UI 305). In some embodiments, for example, the RAG-based engine 300 may be associated with a web-based knowledge base or help center, and the textual response 390 may be displayed on a webpage of the knowledge base or help center. In other embodiments, for example, the RAG-based engine 300 may be a support AI chatbot, and the textual response 390 may be displayed in a chat window. In some embodiments, for example, the RAG-based engine 300 may track a user satisfaction rating with respect to the textual response 390, for example, by posing the question "are you satisfied with this answer" ? or "did that response and/or document answer your question?". In this regard, a poor user satisfaction rating associated with a textual response 390 may trigger the addition of one or more new synthetic question embeddings 354 to the embeddings database 250, or one or more new source texts 360 to the text database 255.

Figure 4:
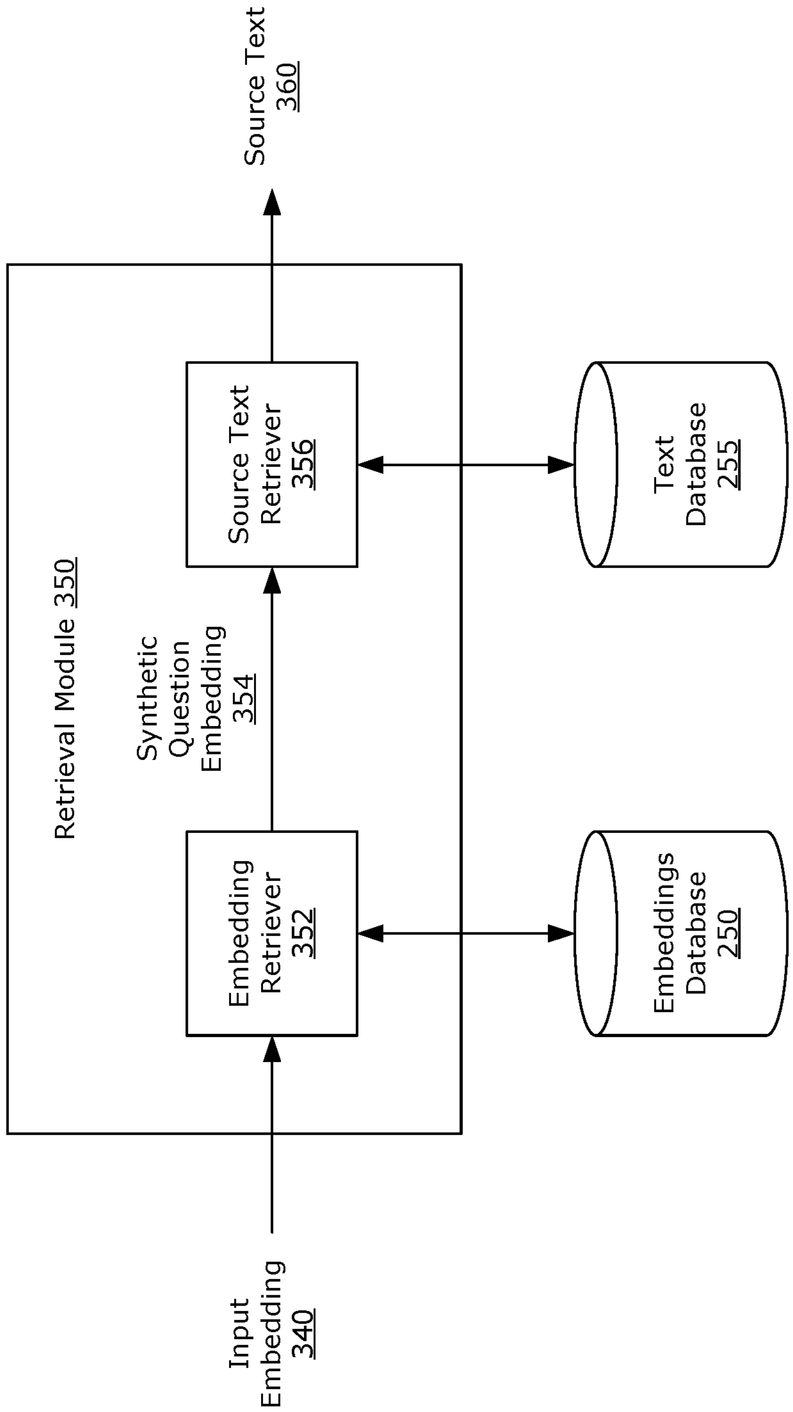
FIG. 4 is a block diagram illustrating an example retrieval module, in accordance with example embodiments of the present disclosure.

FIG. 4 shows a block diagram of an example architecture for the retrieval module 350, in accordance with examples of the present disclosure. The retrieval module 350 may be a software that is implemented in the computing system 200 of FIG. 2, in which the processor 202 is configured to execute instructions of the retrieval module 350 stored in the memory 204. The retrieval module 350 includes an embedding retriever 352 and a source text retriever 356.

In examples, the embedding retriever 352 may receive the input embedding 340 and may retrieve a synthetic question embedding 354 from the embeddings database 250, where the embeddings database 250 stores a plurality of synthetic question embeddings defining an embedding space and in which the plurality of synthetic question embeddings are associated with (e.g., mapped to) corresponding source texts stored in the text database 255. In examples, a synthetic question embedding 354 may be a representation of a synthetic question, where a synthetic question may represent a question that is generated based on a source text 360, to which a corresponding answer may be found or inferred from the source text 360. In some embodiments, for example, a synthetic question embedding may represent a synthetic question-answer (QA) pair, for example, where the answer to the synthetic question is derived from a source text 360 and stored as a corresponding answer embedding in the embeddings database 250. In examples, the text database 255 may represent an internal database, for example, a knowledge base or other internal database containing a plurality of documents or other content sources, such as reports, research papers, product specifications, presentations, manuals, guides, training material, transcripts, etc. In examples, a source text 360 may represent a document chunk, for example, a portion of a document or other content source (e.g., separated based on headings, etc.) that is stored in the text database 255.

In examples, each of the plurality of synthetic question embeddings (or QA pairs) may be generated and stored in the embeddings database 250 prior to receiving the user input 310. An approach to generating each of the plurality of synthetic question embeddings may now be described, with reference to the RAG-based engine 300 of FIG. 3. Prior to generating the plurality of synthetic question embeddings (or QA pairs), a plurality of corresponding synthetic questions may first be generated. The term "synthetic question" may be used to refer to a question that is generated by the LLM 380 independent of a user input in the form of a query, keyword or question, etc. In other words, a synthetic question should be understood to be distinct from an updated user input 325 (described above) that is a rephrasing of a user input 310. For example, the prompt generator 370 may provide a prompt to the LLM 380 instructing the LLM 380 to generate a set of synthetic questions, based on a source text 360 stored in the text database 255. For example, a prompt may be provided to the LLM 380 that provides context to the LLM 380 (e.g., the prompt may indicate that the LLM 380 is a support AI chatbot and that the LLM 380 is trying to answer user questions). The prompt may, after providing a specific source text 360, instruct the LLM 380 to generate possible questions that have answers that could be found in the source text 360. For example, the prompt generator 370 may obtain one or more source texts 360 and insert instructions to the LLM to generate the following example prompt (example 2):

You are exceptionally skilled at extracting questions and answers cards from the supplied help texts. The questions and answers that you create must only be created from content that is found in the help texts provided. If there is a set of instructions provided by the help texts return all of the information defined in those instructions.

*********

You MUST respond in this format for each card:

[CARD]

Question: <Required: Question that you anticipate a user might ask>

Answer: <Required: The detailed answer that you inferred from the provided message>

[/CARD].

********

The next message is the help content, it's related to topic "#{node}"

Generate as many cards as you can. End your message by saying MORE if you have more useful cards in you or say NEXT to get a new document.

The example prompt of example 2 may be considered to have several main parts. First, there are instructions to the LLM that provide instructions to generate a plurality of paired synthetic questions and answers (e.g., associated with a respective card) based on content provided in a help text (e.g., source text 360). This is followed by a separator (in this case, multiple asterisks) and then the format of the question and answer for each card is identified. This is followed by another separator and then further instructions for generating a plurality of cards for a given source text 360 (e.g., indicating both the source document and the specific chunk or position within the document) before moving on to repeat the process with a new source text 360.

In examples, a synthetic question may represent a specific question that can be answered based on the source text 360, not simply a summary of the source text 360. In examples, each synthetic question may include a tag that indicates the source text 360, for example, indicating both the source document and the specific chunk or position within the document from which the synthetic question was generated. In other examples, each synthetic question may include a tag that indicates whether the question would be posed by a merchant or a customer, among others. In examples, since more than one synthetic question may be generated from each source text 360, it is understood that more than one synthetic question may be mapped to the same source text 360. In this regard, examples of the present disclosure leverage the semantic understanding capabilities of the LLM 380 to formulate more accurate and relevant synthetic questions, thereby improving the accuracy of document retrieval and response generation.

In examples, the embedding generator 330 may apply an embedding transformation to a set of synthetic questions, to generate a set of synthetic question embeddings. In some embodiments, for example, the embedding generator 330 may be an encoder. In examples, the embedding generator 330 may transform each synthetic question into a respective embedding vector within an embedding space, to create the set of synthetic question embeddings. In examples, the embedding generator 330 may apply the transformation using a neural network model. In examples, the set of synthetic question embeddings may then be stored in the embedding database 250. In examples, a synthetic question embedding 354 may include a mapping to a corresponding source text 360, for example, where the mapping includes information identifying the source document from which it was generated, and optionally, the specific portion of the source documents from which the associated synthetic question was produced.

Returning to FIG. 4, the embedding retriever 352 may receive the input embedding 340 and may interface with the embeddings database 250 to identify one or more corresponding synthetic question embeddings 354, based on similarity measures between embeddings of the plurality of synthetic question embeddings and the input embedding 340. In examples, the embedding retriever may perform a vector similarity search operation within the embedding space to identify the one or more synthetic question embeddings 354. In examples, a nearest neighbor approach may be used to identify the one or more synthetic question embeddings 354. In examples, the similarity measure may be a distance measure (e.g., a Euclidean distance measured between the input embedding 340 and the synthetic question embedding 354 in any direction within the embedding space), or the similarity measure may be a cosine similarity (e.g., a cosine of the angle between the input embedding 340 and the synthetic question embedding 354), among other possibilities. In some examples, the identified synthetic questions may be ranked, for example, taking into account a context of a user's current page, or recent viewing or search history, the identity or user type (e.g., merchant, customer etc.) of the user, among other user information. In some examples, the identified synthetic questions may be ranked using the Boolean model of information retrieval. For example, each source text 360 may be tagged with multiple keywords and the source text 360 may be included or excluded based on the presence or absence of those keywords.

In examples, the source text retriever 356 may receive the synthetic question embedding 354 and may query the text database 255 to obtain a corresponding source text 360, for example, based on a mapping between the synthetic question embedding 354 and the source text 360.

Figure 5:
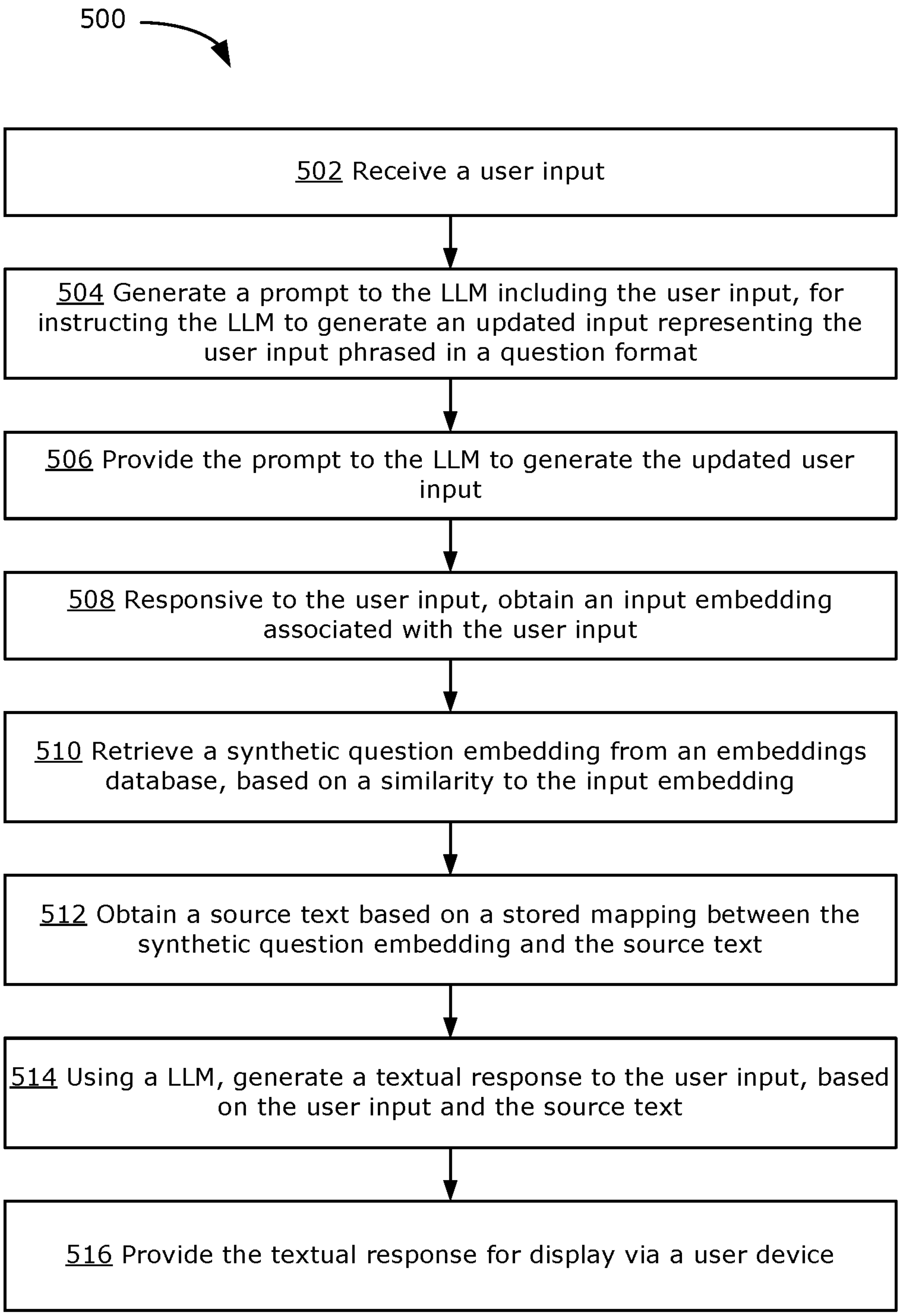
FIG. 5 is a flowchart illustrating an example method for operation of an example RAG-based engine, in accordance with examples of the present disclosure.

FIG. 5 is a flowchart of an example method 500 for operation of an example RAG-based engine, in accordance with examples of the present disclosure. The method 500 may be performed by the computing system 200. For example, a processing unit of a computing system (e.g., the processor 202 of the computing system 200 of FIG. 2) may execute instructions (e.g., instructions of the RAG-based engine 300) to cause the computing system to carry out the example method 500. The method 500 may, for example, be implemented by an online platform or a server.

At an operation 502, a user input 310 may be received by the RAG-based engine 300. In examples, the user input 310 may be received as a textual input, an audio input, a touch input, as a selection of an item (e.g., a topic or category, or another object) on a webpage of an e-commerce platform, among other inputs. In some embodiments, for example, the user input 310 may be phrased as a question (e.g., "how do I add a product to my online store?") or the user input may not be phrased as a question. For example, a user input 310 may be phrased as a statement (e.g., "I'm trying to add a product to my online store"), a topic or category (e.g., "adding products to an online store"), or a keyword (e.g., "products"), or the user input may be phrased as a problem the user is experiencing (e.g., "I'm having trouble adding products to my online store"), among others.

At an operation 504, a prompt 322 to an LLM 380 including the user input 310, may be generated, for instructing the LLM 380 to generate an updated user input 325 representing the user input phrased in a question format. The operation 504 may, in some embodiments, be performed if the user input 310 does not have a format that corresponds to the format of a synthetic questions (e.g., the user input 310 is not phrased as a question, or the user input 310 is phrased as a question but using unsuitable syntax and/or language such as slang). In some embodiments, the operation 504 may always be performed regardless of the format of the user input 310, such that that the subsequently generated input embedding is generated from the updated user input 325 that has a suitable format. This may help to ensure that the input embedding can be more effectively matched with a synthetic question embedding in order to retrieve a source text that is more likely to be relevant.

At an operation 506, the prompt 322 may be provided to the LLM 380 to generate the updated user input 325.

At an operation 508, responsive to the user input 310, an input embedding 340 may be obtained. In examples, an embedding transformation may be applied to the user input 310 to generate the input embedding 340, for example, the embedding transformation may transform the user input 310 into a respective embedding vector within an embedding space. In other examples, the embedding transformation may be applied to the updated user input 325 to generate the input embedding 340, instead of generating the input embedding 340 directly from the user input 310. In examples, the embedding transformation may be applied using a neural network model.

At an operation 510, a synthetic question embedding 354 may be retrieved from an embeddings database 250, based on a similarity to the input embedding 340. In examples, a vector similarity search operation may be performed to identify one or more synthetic question embeddings 354 from the embeddings database 250. In examples, a nearest neighbor approach may be used to identify the one or more synthetic question embeddings 354.

At an operation 512, a source text 360 may be obtained based on a stored mapping between the synthetic question embedding 354 and the source text 360. In examples, a synthetic question embedding 354 may include a mapping to a corresponding source text 360, for example, where the mapping includes information identifying the source document from which it was generated, as well as the specific portion of the source documents from which the associated synthetic question was produced. In examples, the mapping may be used to query a text database 255 to obtain a corresponding source text 360.

At an operation 514, a textual response 390 to the user input 310 or the updated user input 325 may be generated, using an LLM 380, based on the user input 310 (or the updated user input 325) and the source text 360. For example, a prompt 375 may be generated for the LLM 380, where the prompt 375 instructs the LLM 380 to generate a textual response 390 to the user input 310 or the updated user input 325 based on the information contained in the source text 360. In examples, the LLM 380 may be prompted to parse the source text 360 to output an answer to a question posed in the user input 310.

At an operation 516, the textual response 390 may be provided for display via a user device. For example, the LLM 380 may be configured to cooperate with the UI 305 for displaying the textual response 390 on a display of a user device.

Figure 6:
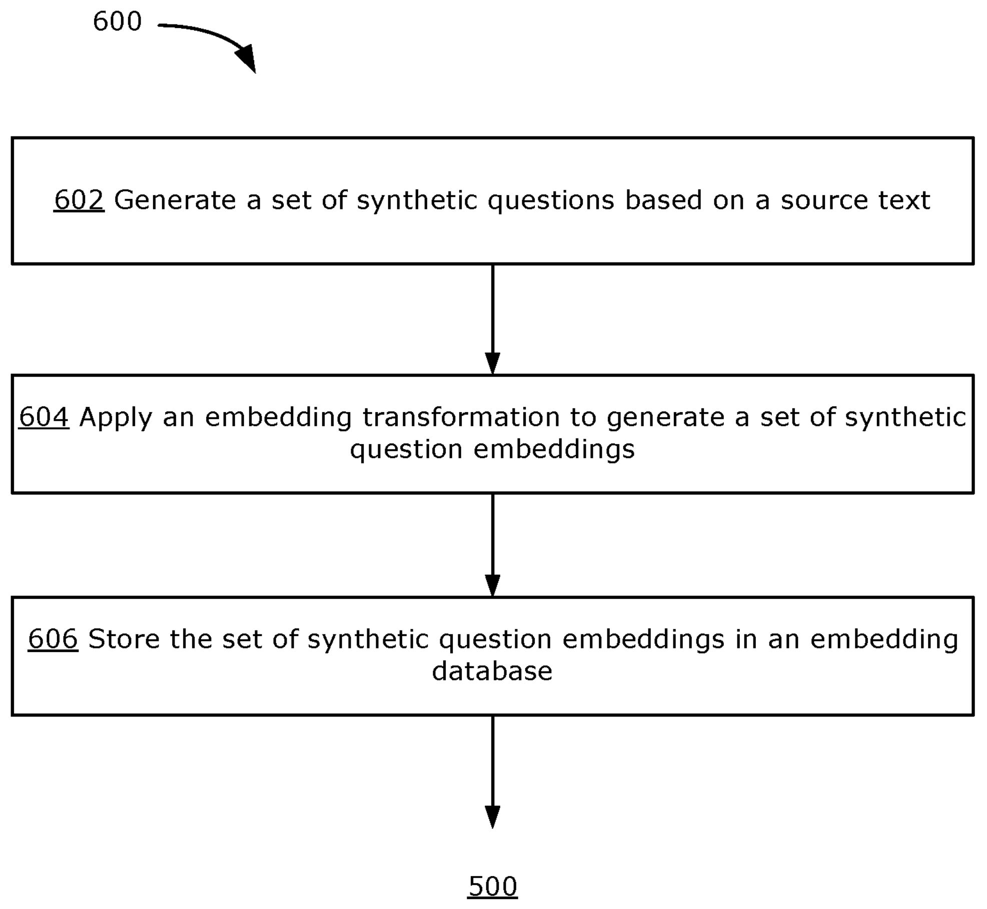
FIG. 6 is a flowchart illustrating an example method for seeding an embedding database with a set of synthetic question embeddings, in accordance with examples of the present disclosure.

FIG. 6 is a flowchart of an example method 600 for seeding an embedding database with a set of synthetic question embeddings, in accordance with examples of the present disclosure. The method 600 may be performed by the computing system 200. For example, a processing unit of a computing system (e.g., the processor 202 of the computing system 200 of FIG. 2) may execute instructions (e.g., instructions of the RAG-based engine 300) to cause the computing system to carry out the example method 600. The method 600 may, for example, be implemented by an online platform or a server.

At an operation 602, a set of synthetic questions or a set of synthetic question and answer pairs may be generated based on a source text 360. In examples, a prompt may be provided to the LLM 380 that provides context to the LLM 380 (e.g., the prompt may indicate that the LLM 380 is exceptionally skilled at extracting question and answer cards from supplied help texts and that the LLM 380 should create question and answer cards according to a specific format) and indicates a specific source text 360 (e.g., indicating both the source document and the specific chunk or position within the document) from which the synthetic question (or question-answer pair) should be generated. In examples, the prompt may instruct the LLM 380 to generate possible questions where answers to the one or more possible questions can be found in the source text 360.

At an operation 604, an embedding transformation may be applied to generate a set of synthetic question embeddings. In examples, the embedding transformation may transform each synthetic question in the set of synthetic questions into a respective embedding vector within an embedding space. In examples, the embedding transformation may be applied using a neural network model.

At an operation 606, the set of synthetic question embeddings may be stored in an embedding database 250.

Figure 7:
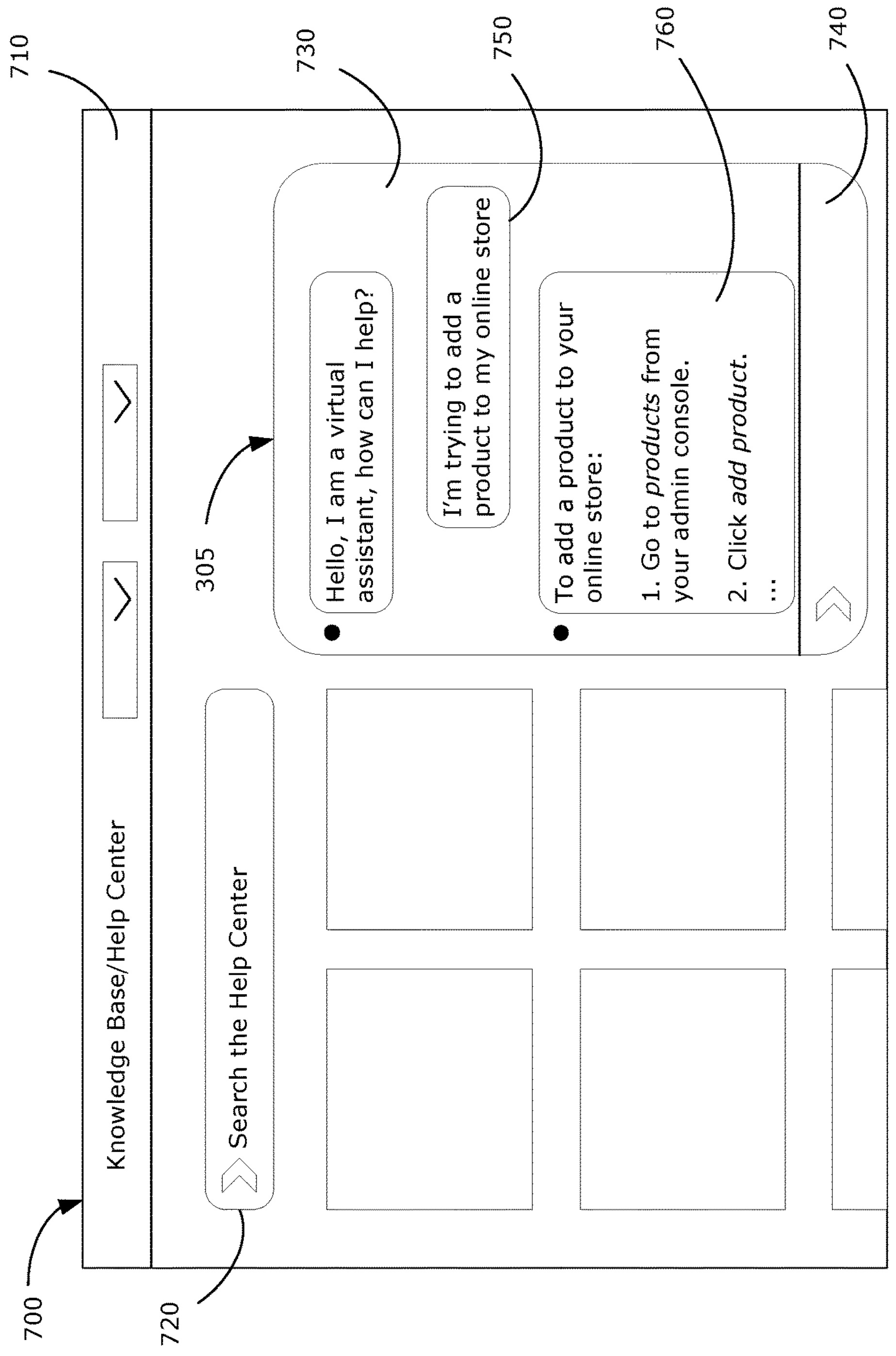
FIG. 7 illustrates a simplified example user interface showing operation of an example RAG-based engine, in accordance with examples of the present disclosure.

FIG. 7 illustrates an example of a simplified RAG-based engine UI 305, which may be implemented by an example of the RAG-based engine 300 as disclosed herein (e.g., using the example method 500). In the example of FIG. 7, the UI 305 is a chatbot UI. It should be understood that this example is not intended to be limiting.

In this simple example, a user is viewing and navigating through a knowledge base and/or help center 700 that has multiple pages or tabs, as indicated in the navigation bar 710. The knowledge base and/or help center 700 includes an input portion 720 in which the user may enter text input, such as a help request or another user input 310. In some examples, the user may provide input by other means, such as voice input and/or touch input.

A chatbot UI 305 (e.g., provided by the disclosed RAG-based engine 300) is presented to the user. The chatbot UI 305 includes a chat history portion 730 displaying the most recent inputs and outputs in the chat history and an input portion 740 in which the user may enter text input, such as a help request or another user input 310. In some examples, the user may provide input by other means, such as voice input and/or touch input.

In FIG. 7, the user has provided a natural language help request 750 in the chatbot UI 305. In examples, the help request 750 may be phrased as a question (e.g., "how do I add a product to my online store?" or the help request 750 may not be phrased as a question (e.g., "I'm trying to add a product to my online store"). In response to receiving the help request 750 via user input 310, the RAG-based engine 300 may rephrase the help request into an updated user input that may be in the form of a relevant question (e.g., rephrased help request (not shown)) based on a semantic understanding of the help request 750. The RAG-based engine 300 obtains an input embedding 340 associated with the user input 310 (e.g., by applying an embedding transformation to the rephrased help request), obtains an associated source text 360 based on a similarity between the input embedding 340 and a synthetic question embedding 354 and generates and provides a prompt to the LLM 380 to output a textual response 390 that answers the user's help request 750. The chatbot UI 700 presents the textual response 390 in a response 760 indicating that the user should navigate to the administrator console page and perform a number of steps.

Examples of the present disclosure may enable more accurate response generation by a LLM, for example, by enabling more accurate identification of relevant sources for use by a LLM in generating responses. A RAG-based engine as disclosed herein may be used in various implementations, such as on a website, a portal, a software application, etc. In an example, the disclosed RAG-based engine may be implemented on an e-commerce platform, for example to assist a user (e.g., a merchant, store owner or store employee) in providing answers to specific questions related to operation of the e-commerce platform, for example, performing tasks on an administrative webpage or portal of an online store (e.g., as shown in FIG. 9).

For example, the RAG-based engine as disclosed herein may be provided as an engine of the e-commerce platform. A user may interact with the e-commerce platform via a user device (e.g., a merchant device or a customer device, generally referred to as a user device) to provide user input and receive a textual response as described above.

In various examples, the present disclosure provides a technical solution that enables more accurate and more efficient operation of a RAG-based engine by enabling the retrieval of more accurate source information, for use by an LLM in generating a response to a user input. The use of synthetic question embeddings is an efficient mechanism for narrowing the pool of potential source documents, which enables the LLM to generate a more accurate response. Providing the LLM with more relevant information may cause the LLM to generate an appropriate output in fewer iterations, thereby reducing the unnecessary consumption of computing resources (e.g., processing power, memory, computing time, etc.) associated with performing multiple iterations of prompting to achieve a desired result from the LLM. Examples of the disclosed RAG-based engine may improve the performance of e-commerce platforms or merchant websites by presenting an improved help center or knowledge base experience to users. Examples of the disclosed technical solution leverage the semantic understanding capabilities of an LLM to formulate more accurate and relevant synthetic questions, thereby improving the accuracy and efficiency of document retrieval and response generation.

Although the present disclosure has described a LLM in various examples, it should be understood that the LLM may be any suitable language model (e.g., including LLMs such as LLaMA, Falcon 40B, GPT-3, GPT-4 or ChatGPT, as well as other language models such as BART, among others).

Although the present disclosure describes methods and processes with operations (e.g., steps) in a certain order, one or more operations of the methods and processes may be omitted or altered as appropriate. One or more operations may take place in an order other than that in which they are described, as appropriate.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. Any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD- ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer-implemented method comprising:
- responsive to a user input, obtaining an input embedding associated with the user input;
- retrieving a synthetic question embedding from an embeddings database, based on a similarity of the synthetic question embedding to the input embedding;
- retrieving at least one source text based on a mapping that maps synthetic question embeddings to corresponding source texts;
- using a large language model (LLM), generating a textual response to the user input based on the user input and the at least one source text; and
- providing the generated textual response for display via a user device.

2. The method of claim 1, wherein the synthetic question embedding is an embedding representation of a corresponding synthetic question, and wherein the mapping includes information identifying one or more source texts from which the synthetic question was generated.

3. The method of claim 2, further comprising:
- prior to receiving the user input:
  - using the LLM, generating the synthetic question based on the at least one source text;
  - applying an embedding transformation to the synthetic question to generate the synthetic question embedding; and
  - storing the synthetic question embedding in the embeddings database.

4. The method of claim 1, wherein the embeddings database stores a plurality of embeddings defining an embedding space and wherein retrieving the synthetic question embedding from the embeddings database comprises:
- performing a vector similarity search operation within the embedding space to identify the synthetic question embedding, based on similarity measures between embeddings of the plurality of synthetic question embeddings and the input embedding.

5. The method of claim 4, wherein performing the vector similarity search operation comprises:
- ranking a plurality of candidate synthetic question embeddings based on contextual information for the user.

6. The method of claim 4, wherein the similarity measure is a distance measure or a cosine similarity.

7. The method of claim 1, wherein obtaining the input embedding associated with the user input comprises:
- applying an embedding transformation to the user input to generate the input embedding.

8. The method of claim 7, wherein the method further comprises:
- prior to applying the embedding transformation to generate the input embedding:
  - determining whether the user input is phrased in a question format;
  - responsive to determining that the user input is not phrased in a question format, generating a prompt to the LLM including the user input, the prompt for instructing the LLM to generate an updated user input that is phrased in a question format; and
  - providing the prompt to the LLM to generate the updated user input.

9. The method of claim 1, wherein generating the textual response to the user input comprises:
- generating a prompt to the LLM, the prompt including the user input and the source text; and
- providing the prompt to the LLM to generate the textual response.

10. The method of claim 9, wherein the prompt includes information about the user's recent viewing or search history.

11. A computer system comprising:
- a processing unit configured to execute computer-readable instructions to cause the system to:
  - responsive to a user input, obtain an input embedding associated with the user input;
  - retrieve a synthetic question embedding from an embeddings database, based on a similarity of the synthetic question embedding to the input embedding;
  - retrieve at least one source text based on a mapping that maps synthetic question embeddings to corresponding source texts;
  - using a large language model (LLM), generate a textual response to the user input based on the user input and the at least one source text; and
  - provide the generated textual response for display via a user device.

12. The computer system of claim 11, wherein the synthetic question embedding is an embedding representation of a corresponding synthetic question, and wherein the mapping includes information identifying one or more source texts from which the synthetic question was generated.

13. The computer system of claim 12, wherein the processing unit is further configured to execute computer-readable instructions to cause the computer system to, prior to receiving the user input:

use the LLM, generating the synthetic question based on the at least one source text;

apply an embedding transformation to the synthetic question to generate the synthetic question embedding; and store the synthetic question embedding in the embeddings database.

14. The computer system of claim 11, wherein the embeddings database stores a plurality of embeddings defining an embedding space and wherein in retrieving the synthetic question embedding from the embeddings database, the processing unit is further configured to execute computer-readable instructions to cause the computer system to:

perform a vector similarity search operation within the embedding space to identify the synthetic question embedding, based on similarity measures between embeddings of the plurality of synthetic question embeddings and the input embedding.

15. The computer system of claim 14, wherein in performing the vector similarity search operation, the processing unit is further configured to execute computer-readable instructions to cause the computer system to:

rank a plurality of candidate synthetic question embeddings based on contextual information for the user.

16. The computer system of claim 14, wherein the similarity measure is a distance measure or a cosine similarity.

17. The computer system of claim 11, wherein in obtaining the input embedding associated with the user input, the processing unit is further configured to execute computer-readable instructions to cause the computer system to:

apply an embedding transformation to the user input to generate the input embedding.

18. The computer system of claim 17, wherein the processing unit is further configured to execute computer-readable instructions to cause the computer system to, prior to applying the embedding transformation to generate the input embedding:

determine whether the user input is phrased in a question format;

responsive to determining that the user input is not phrased in a question format, generate a prompt to the LLM including the user input, the prompt for instructing the LLM to generate an updated user input that is phrased in a question format; and provide the prompt to the LLM to generate the updated user input.

19. The computer system of claim 11, wherein in generating the textual response to the user input, the processing unit is further configured to execute computer-readable instructions to cause the computer system to:

generate a prompt to the LLM, the prompt including the user input and the source text; and provide the prompt to the LLM to generate the textual response.

20. A non-transitory computer-readable medium storing instructions that, when executed by a processing unit of a computing system, cause the computing system to:

responsive to a user input, obtain an input embedding associated with the user input;

retrieve a synthetic question embedding from an embeddings database, based on a similarity of the synthetic question embedding to the input embedding;

retrieve at least one source text based on a mapping that maps synthetic question embeddings to corresponding source texts;

using a large language model (LLM), generate a textual response to the user input based on the user input and the at least one source text; and provide the generated textual response for display via a user device.

* * * * *